(12) United States Patent
Huang

(10) Patent No.: US 12,070,708 B2
(45) Date of Patent: Aug. 27, 2024

(54) FILTERING DEVICE

(71) Applicant: VERO VERIA CORPORATION, New Taipei (TW)

(72) Inventor: Chien-Teh Huang, New Taipei (TW)

(73) Assignee: VERO VERIA CORPORATION, New Taipei (TW)

( * ) Notice: Subject to any disclaimer, the term of this patent is extended or adjusted under 35 U.S.C. 154(b) by 458 days.

(21) Appl. No.: 17/359,701

(22) Filed: Jun. 28, 2021

(65) Prior Publication Data

US 2022/0203282 A1 Jun. 30, 2022

(30) Foreign Application Priority Data

Dec. 29, 2020 (TW) .................................. 109146727

(51) Int. Cl.
*B01D 46/00* (2022.01)
*B01D 46/10* (2006.01)

(52) U.S. Cl.
CPC ......... *B01D 46/0005* (2013.01); *B01D 46/10* (2013.01)

(58) Field of Classification Search
None
See application file for complete search history.

(56) References Cited

U.S. PATENT DOCUMENTS

| | | | | |
|---|---|---|---|---|
| 4,560,395 A * | 12/1985 | Davis | ...................... | F24F 8/108 |
| | | | | 55/385.2 |
| 5,230,723 A * | 7/1993 | Travis | ...................... | A47L 5/38 |
| | | | | 55/482 |
| 6,444,004 B1 * | 9/2002 | Tang | ..................... | F04D 29/441 |
| | | | | 55/473 |
| 6,499,948 B1 * | 12/2002 | Iyer | ...................... | F04D 29/545 |
| | | | | 416/189 |

* cited by examiner

*Primary Examiner* — Jonathan M Peo
(74) *Attorney, Agent, or Firm* — Amin, Turocy & Watson, LLP

(57) ABSTRACT

A filtering device is provided and has an integrally formed housing, a filtering assembly disposed on one side of the housing and a fan disposed on the other side of the housing through a closure plate. The housing and the closure plate are fabricated separately, thereby allowing the filtering device to be formed with great weight and volume. Further, during operation of the fan, the housing is prevented from vibration, and operation noise of the filtering device is reduced.

10 Claims, 9 Drawing Sheets

FILTERING DEVICE

CROSS-REFERENCE TO RELATED APPLICATIONS

This application claims priority to Taiwan Application Serial No. 109146727, filed on Dec. 29, 2020. The entirety of the above-mentioned patent application is hereby incorporated by reference herein and made a part of this specification.

BACKGROUND

1. Technical Field

The present disclosure relates to filtering devices, and more particularly, to a filtering device applicable in a clean room.

2. Description of Related Art

Currently, a semiconductor plant is generally equipped with a fan filtering device to clean air and meet the specification of a clean room.

A conventional fan filtering device usually has a housing for receiving a fan device. The housing is made of a plurality of plate bodies that are screwed, riveted or welded together. Since the plate bodies have a thickness below 1.0 mm, it is easy to cut hands during construction. Further, when the fan device operates, the plate bodies are easy to vibrate, thereby causing the fan filtering device to generate great operation noise.

Further, since the conventional fan filtering device is disposed over a frame of a ceiling, it is easy to be squashed, thereby resulting in a poor efficiency. Furthermore, when the plate bodies vibrate, the connection between the fan filtering device and the frame may be loosened, resulting in an unexpected gap between the fan filtering device and the frame and hence causing poor air filtering or backflow of waste gas to the clean room.

Therefore, how to overcome the above-described drawbacks of the prior art has become an urgent issue in the art.

SUMMARY

In view of the above-described drawbacks of the prior art, the present disclosure provides a filtering device, which comprises: a housing of an integrally formed channel-shaped structure, wherein the housing has a first side, a second side opposite to the first side and having a hollow-out portion, and a receiving space defined by the channel-shaped structure; a closure plate which is an integrally formed plate structure, and is disposed on the second side of the housing for covering the hollow-out portion; a filtering assembly disposed on the first side of the housing; a fan received in the receiving space and fastened to the second side of the housing; and a wind guiding plate received in the receiving space and fastened onto the closure plate.

In the aforementioned filtering device, the first side of the housing has an opening serving as an outlet port, and the filtering assembly covers the opening.

In the aforementioned filtering device, the closure plate has a through hole serving as an inlet port, and the fan is disposed at the through hole.

In the aforementioned filtering device, the present disclosure further comprises a plurality of ribs formed on surfaces of the housing and the closure plate.

In the aforementioned filtering device, the closure plate is arranged with a filter corresponding in position to the fan.

In the aforementioned filtering device, the filtering assembly comprises a filter structure.

In the aforementioned filtering device, the fan comprises a fan structure, a support member for disposing the fan structure over the closure plate, and a shaft member axially connected to the support member for rotating the fan structure, wherein the fan is fastened onto the closure plate.

In the aforementioned filtering device, the wind guiding plate is integrally formed to serve as a cover for covering the fan.

In the aforementioned filtering device, the wind guiding plate has a plate body and a plurality of block walls vertically disposed on sides of the plate body, wherein each of the block walls has a notch serving as an outlet port positioned between a first surface of the plate body and adjacent two of the block walls. For example, each of the block walls of the wind guiding plate is bent outward at a top thereof to form a sheet, wherein the sheet has a plurality of third fastening holes, and a plurality of bolts pass through the third fastening holes and a plurality of fourth fastening holes of the closure plate so as to fasten the wind guiding plate onto the closure plate.

In the aforementioned filtering device, the present disclosure further comprises an electronic device driving the fan.

In the aforementioned filtering device, the housing is integrally formed by die casting of aluminum alloy.

In the aforementioned filtering device, the wind guiding plate is integrally formed by die casting of aluminum alloy.

In the aforementioned filtering device, the closure plate is integrally formed by die casting of aluminum alloy.

According to the present disclosure, the housing and the closure plate are fabricated separately, thereby allowing the filtering device to be formed with great weight and volume. Further, since the housing is integrally formed, during operation of the fan, the housing is prevented from vibration. Compared with the prior art, the present disclosure increases structural strength of the filtering device and reduces vibration and noise. Further, the present disclosure avoids loosening between a frame of a ceiling and the filtering device that would result in an unexpected gap therebetween. Hence, the present disclosure effectively avoids poor air filtering or backflow of waste gas to the room.

DETAILED DESCRIPTION

Figure 1A:
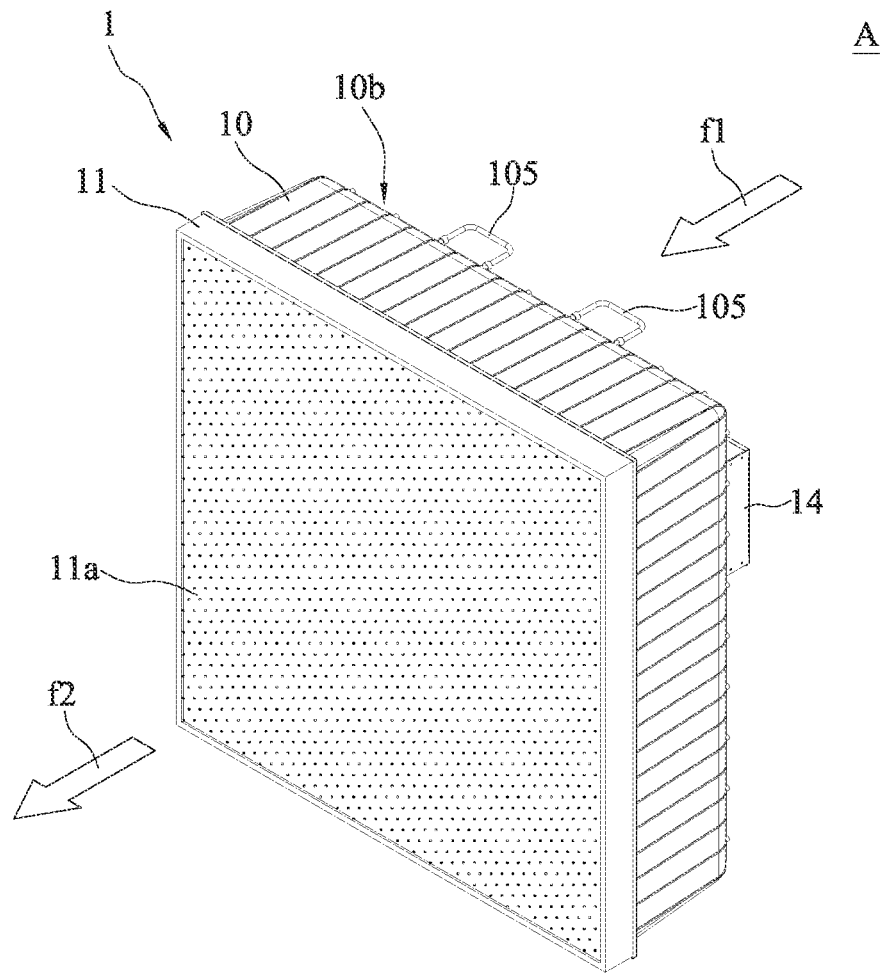
FIG. 1A is a schematic front perspective view of a filtering device according to the present disclosure.

The following illustrative embodiments are provided to illustrate the present disclosure, these and other advantages and effects can be apparent to those skilled in the art after reading this specification.

It should be noted that all the drawings are not intended to limit the present disclosure. Various modifications and variations can be made without departing from the spirit of the present disclosure. Further, terms such as "four," "on," "a," etc., are merely for illustrative purposes and should not be construed to limit the scope of the present disclosure.

FIGS. 1A to 2D are schematic views of a filtering device 1 according to the present disclosure. Referring to FIGS. 1A to 2D, the filtering device 1 has a housing 10, a closure plate 10', a filtering assembly 11, a fan 12 and a wind guiding plate 15.

The housing 10 has an integrally formed channel-shaped structure (or groove structure) with a hollow-out portion 104 on a bottom thereof. In an embodiment, the housing 10 is integrally formed by die casting of aluminum alloy, and has a thickness of about 1.5 mm and a weight of about 13 kg. The channel-shaped structure defines a receiving space S with a symmetrical profile. In an embodiment, the receiving space S has a cross section of square with an area of 1200 mm×1200 mm. Alternatively, the receiving space S can have a cross section of circle or other regular polygon. The housing 10 has a first side 10a at one side of the receiving space S and close to a side of the filtering assembly 11, and a second side 10b at the other side of the receiving space S and having the hollow-out portion 104. The closure plate 10' is disposed on the second side 10b (e.g., in a removable manner) to cover the hollow-out portion 104. In an embodiment, the hollow-out portion 104 has an area of 1000 mm×1000 mm. As such, the tonnage of the die casting machine for integrally forming the housing 10 only needs 30 tons. Without the hollow-out portion 104, the tonnage of the die casting machine must reach more than 69 tons. Since a general die casting machine cannot reach such a large tonnage, the housing without the hollow-out portion cannot be formed.

In an embodiment, the first side 10a of the housing 10 has a symmetrical shape. In an embodiment, the first side 10a of the housing 10 has a cross section of square, and the area (cross-sectional area) A1 of the first side 10a is greater than the area (cross-sectional area) A2 of the second side 10b, as shown in FIG. 2B. For example, the first side 10a has an opening 100 for serving as an outlet port, and the closure plate 10' has a through hole 101 formed in the middle thereof for serving as an inlet port. Therefore, the first side 10a of the housing 10 is served as the outlet port for an airflow, and the second side 10b of the housing 10 (or the closure plate 10') is served as the inlet port for the airflow. It should be understood that the size of the housing 10 can be designed according to needs.

Further, the closure plate 10' has an integrally formed plate structure. In an embodiment, the closure plate 10' is integrally formed by die casting of aluminum alloy, and has a thickness of about 1.5 mm and a weight of about 5.8 kg. The closure plate 10' is screwingly fastened onto the second side 10b of the housing 10 for covering the hollow-out portion 104. For example, the second side 10b of the housing 10 and the closure plate 10' have corresponding connecting holes 108, 108' formed at edges thereof for fastening the closure plate 10' to the second side 10b of the housing 10. The connecting holes 108, 108' are formed at the same time as each of the housing 10 and the closure plate 10' is integrally formed, thereby allowing to quickly and accurately align the connecting holes 108, 108' when the closure plate 10' is fastened to the housing 10.

Furthermore, a plurality of ribs 103 are formed on the outside of the housing 10 and the closure plate 10' (e.g., in a mesh shape at the bottom of the groove shown in FIG. 1B) and extend to sides of the groove (in a grid shape of FIG. 1B) so as to increase structural strength and reduce vibration and noise. Alternatively, the ribs 103 can be arranged inside the housing 10.

In addition, the second side 10b of the housing 10 is provided with a filter 13 (e.g., filtering screen) corresponding in position to the fan 12. For example, the filter 13 is positioned at the through hole 101. It should be understood that the type and specification of the filter 13 can be various and the present disclosure is not limited to as such.

The filtering assembly 11 is disposed on the first side 10a of the housing 10 and in close contact with a periphery of the first side 10a.

In an embodiment, the filtering assembly 11 has a filter structure 11a (e.g., filtering screen structure) covering the opening 100. As such, an airflow can flow into the receiving space S and pass through the filter structure 11a so as to be filtered before entering into a laboratory or clean room. It should be understood that the type of the filtering assembly 11 can be various and the present disclosure is not limited to as such.

Figure 1B:
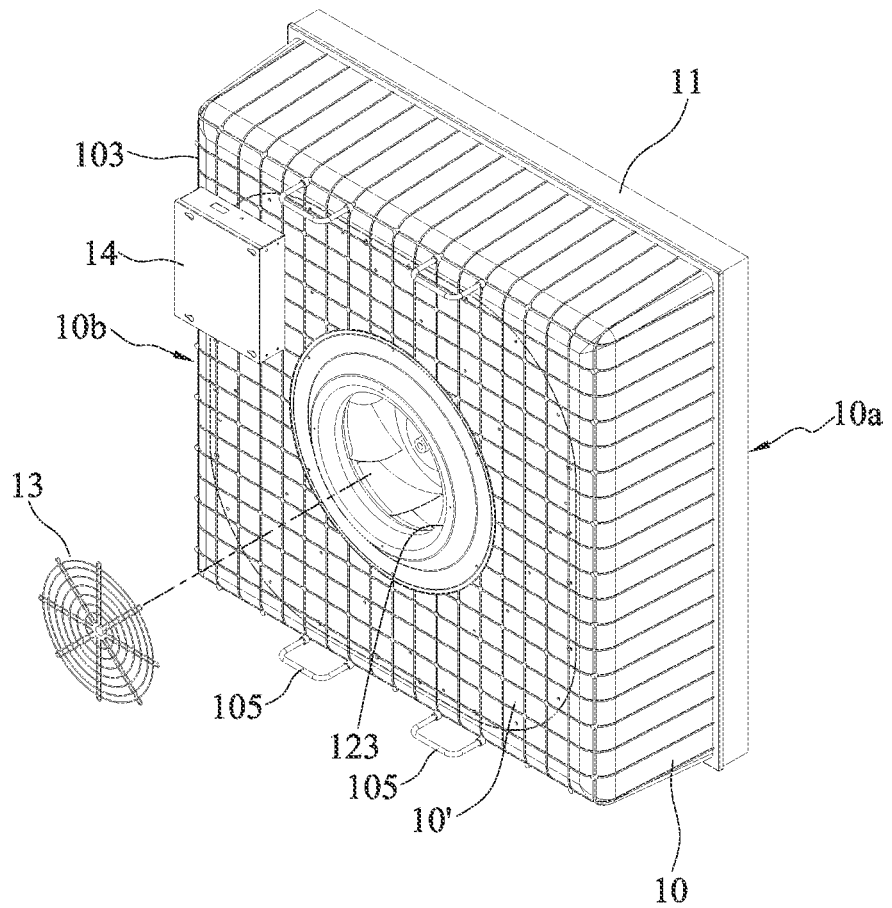
FIG. 1B is a schematic rear perspective view of the filtering device according to the present disclosure.
Figure 1C:
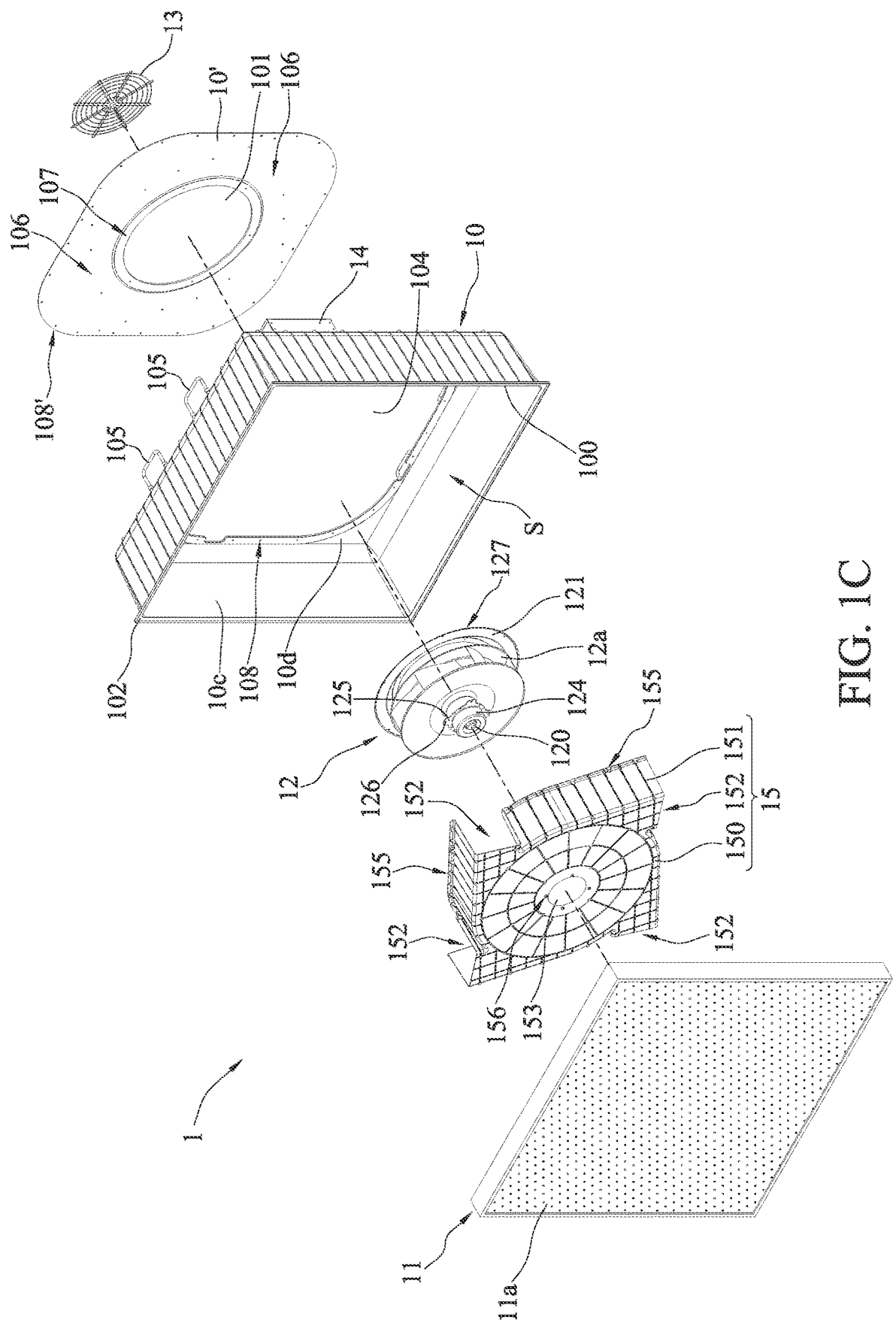
FIG. 1C is a schematic exploded perspective view of the filtering device according to the present disclosure.

Further, at least a positioning member 102 (e.g., a quadrilateral bar or other appropriate structures of FIG. 1C) can be disposed at an edge or corner of the opening 100 of the housing 10. For example, the filtering assembly 11 abuts against an inner edge of the positioning member 102 so as to be assembled in close contact to the first side 10a of the housing 10.

Figure 2A:
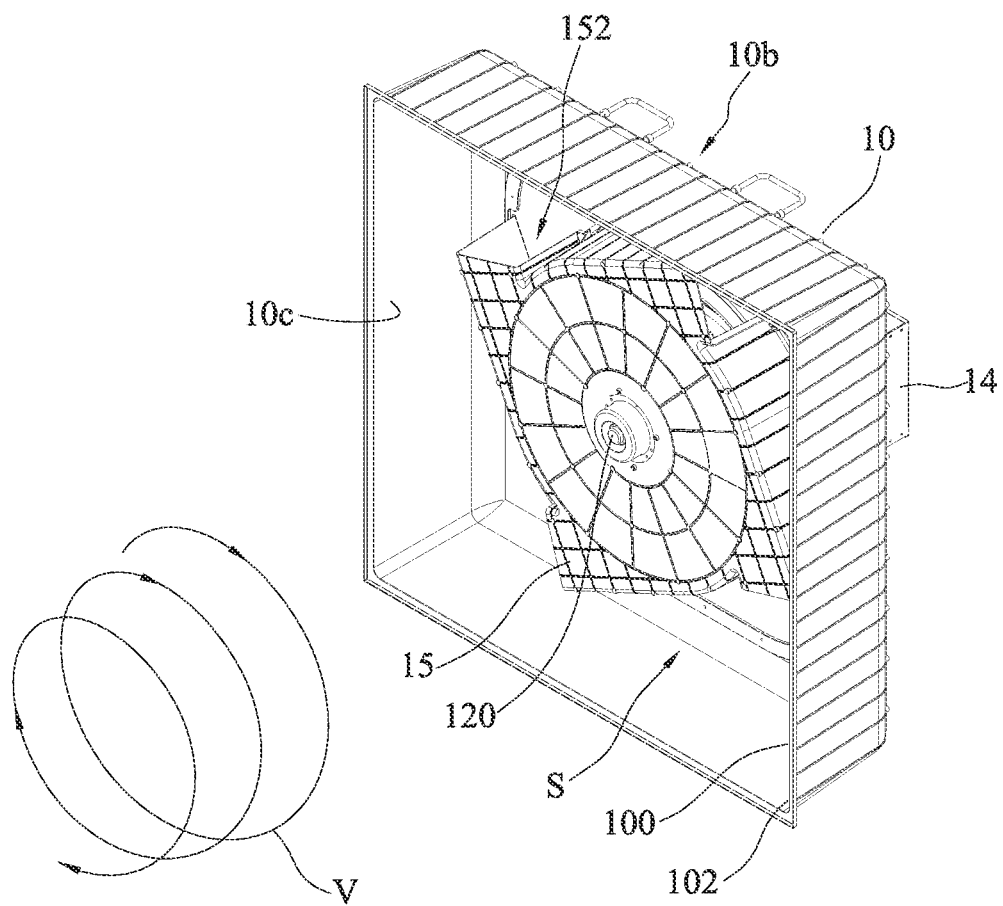
FIG. 2A is a schematic partial perspective view of the filtering device according to the present disclosure.
Figure 2B:
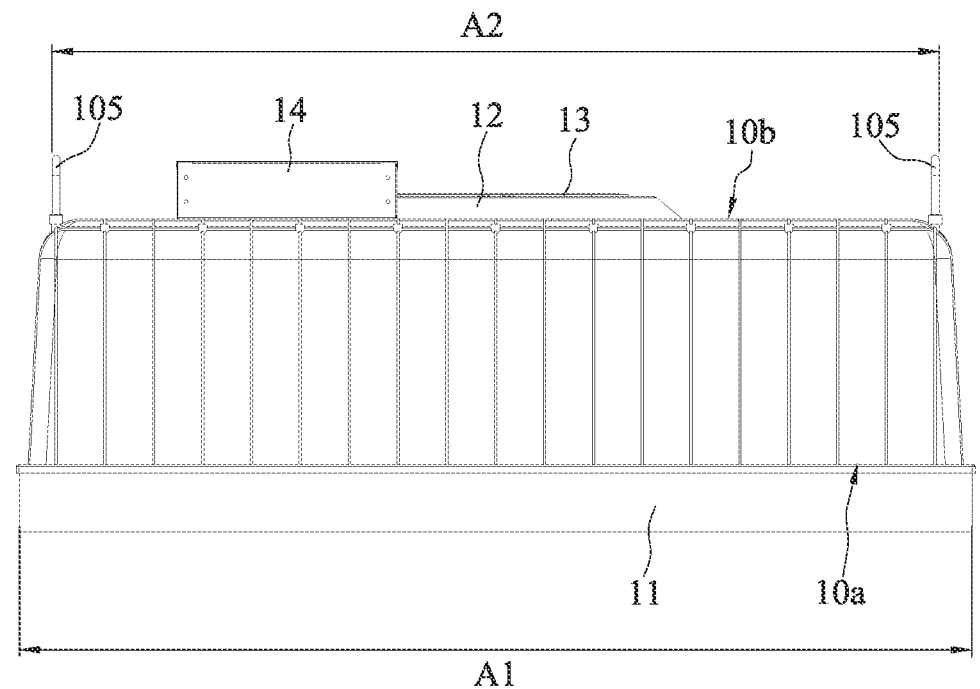
FIG. 2B is a schematic side plan view of FIG. 1A.
Figure 2C:
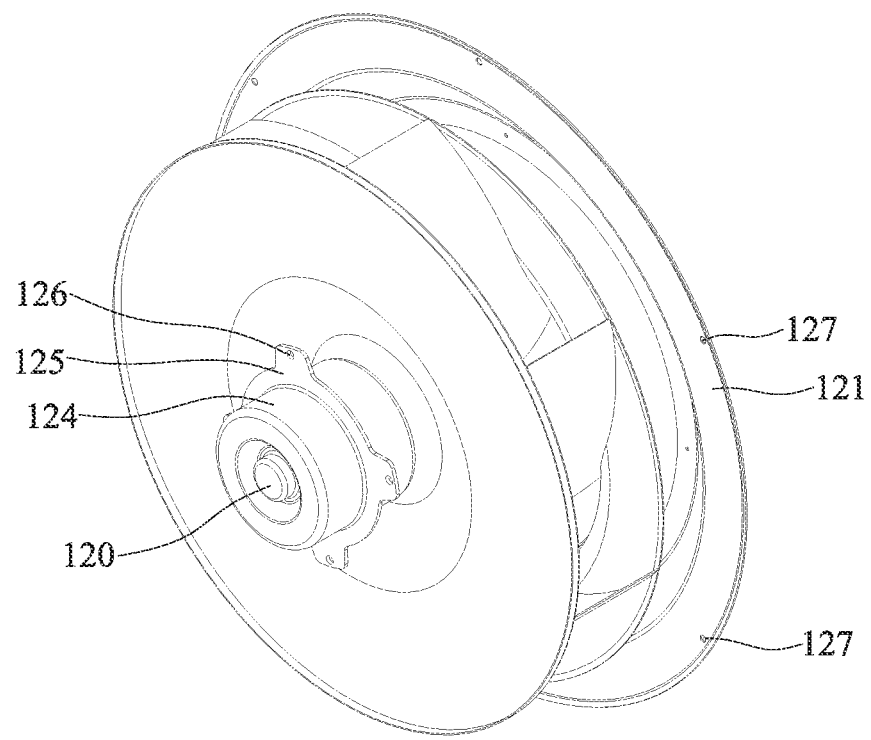
FIG. 2C is a schematic partially enlarged perspective view of a fan of FIG. 1C.

Referring to FIG. 2A, the fan 12 is disposed in the receiving space S and at the through hole 101 so as to be fastened to the second side 10b of the housing 10.

Figure 2D:
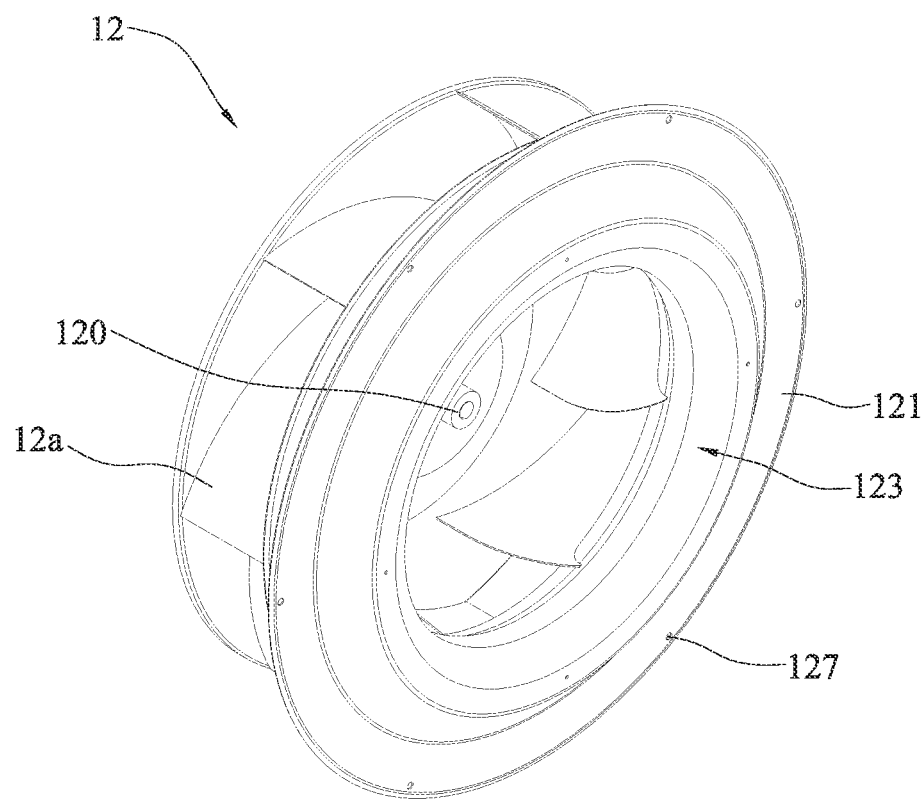
FIG. 2D is a schematic rear perspective view of the fan of FIG. 1C.

In an embodiment, the fan 12 is of a fan machine and has a fan structure 12a, a shaft member 120 for rotating the fan structure 12a, and a support member 121 for disposing the fan structure 12a over the housing 10. For instance, the support member 121 has a disc shape, which has a plurality of second fastening holes 127 formed at an edge thereof and corresponding to a plurality first fastening holes 107 (e.g., six) formed at an edge of the through hole 101 of the closure plate 10'. As such, referring to FIGS. 1C and 2C, a plurality of bolts (not shown) can be passed through the second fastening holes 127 and the first fastening holes 107 so as to dispose the fan 12 on a bottom surface 10d of the housing 10. Referring to FIGS. 1B and 2D, the support member 121 has a through hole 123 and the filter 13 covers the through hole 123. It should be understood that the type of the fan structure 12a can be various and the present disclosure is not limited to as such. The first fastening holes 107 are formed at the same time as the closure plate 10' is integrally formed, thereby allowing to quickly and accurately align the first fastening holes 107 and the through hole 101 when the support member 121 is fastened to the closure plate 10'.

Further, referring to FIGS. 1C and 2A, an electronic device 14 can be disposed on the second side 10b of the housing 10 for driving the shaft member 120 of the fan 12. For example, the electronic device 14 has a circuit board and a controller for electrically controlling the fan 12.

The wind guiding plate 15 serves as a cover for covering the fan 12. In an embodiment, the wind guiding plate 15 is integrally formed by die casting of aluminum alloy, and has a thickness of about 1.5 mm and a weight of about 6 kg. The wind guiding plate 15 is received in the receiving space S and fastened between the filtering assembly 11 and the fan 12.

In an embodiment, referring to FIG. 2A, the wind guiding plate 15 covers one side of the fan 12. For example, referring to FIGS. 1C and 2A, the wind guiding plate 15 is disposed corresponding to the fan 12, axially connected to the shaft member 120 and receives the fan structure 12a. The shaft member 120 is provided with a bearing seat 124. The wind guiding plate 15 has a plate body 150 engaged with the bearing seat 124, and a plurality of (e.g., four) block walls 151 vertically disposed on the plate body 150. Each of the block walls 151 is formed with a notch, which serves as an outlet port 152 for guiding an airflow from the fan structure 12a to flow to a sidewall surface 10c of the receiving space S of the housing 10.

Figure 3A:
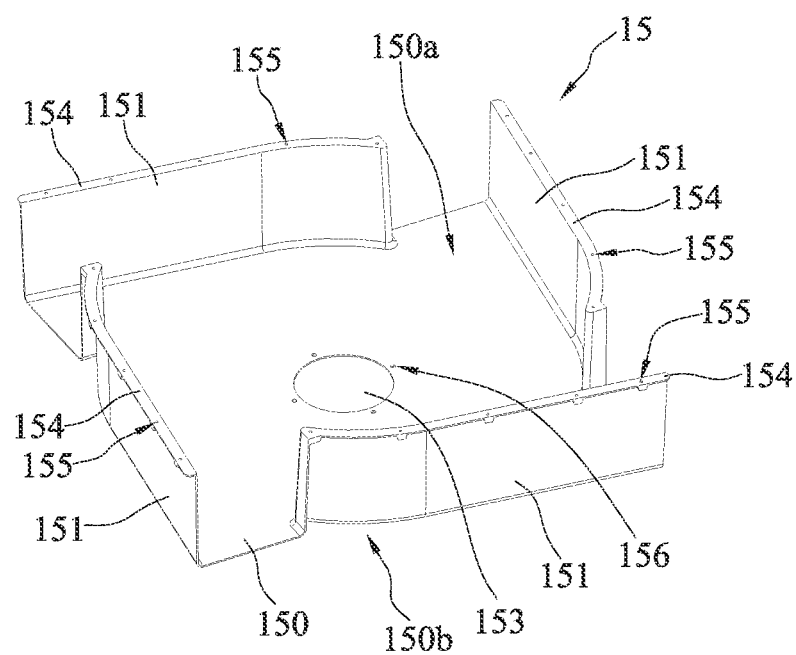
FIG. 3A is a schematic perspective view of a wind guiding plate of the filtering device according to the present disclosure.
Figure 3B:
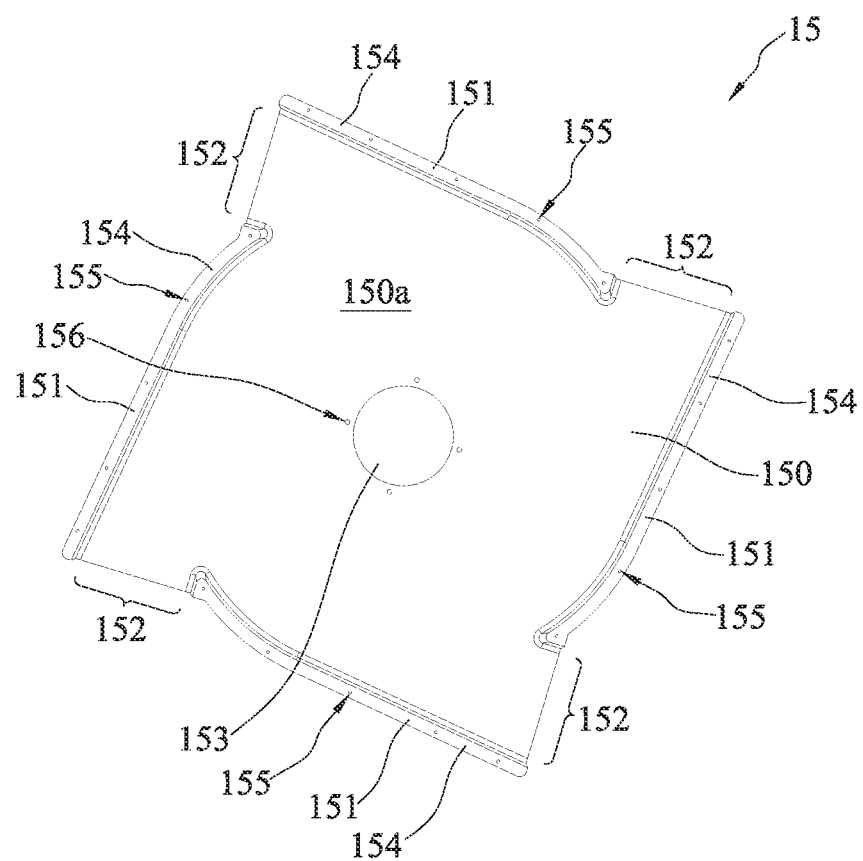
FIG. 3B is a schematic upper plan view of FIG. 3A.

Further, referring to FIGS. 3A and 3B, the plate body 150 has a first surface 150a, a second surface 150b opposite to the first surface 150a, and a mounting hole 153 communicating the first surface 150a and the second surface 150b. The wind guiding plate 15 is axially connected to the bearing seat 124 through the mounting hole 153 thereof, with the second surface 150b of the plate body 150 facing the filtering assembly 11. As such, the fan structure 12a is positioned between the first surface 150a of the plate body 150 and the support member 121. For example, referring to FIGS. 1C and 2C, the bearing seat 124 can be provided with a positioning sheet 125 having a plurality of first positioning holes 126, and a plurality of second positioning holes 156 (e.g., four) are formed around the mounting hole 153 corresponding in position to the first positioning holes 126. Hence, a plurality of bolts (not sown) can be passed through the first positioning holes 126 and the second positioning holes 156 so as to fasten the plate body 150 onto the bearing seat 124.

Furthermore, the first surface 150a of the plate body 150 has a substantially quadrilateral plane shape, and the block walls 151 of a streamline shape are vertically disposed on sides of the first surface 150a of the plate body 150. Referring to FIG. 3B, each of the four outlet ports 152 of the wind guiding plate 15 is positioned between the first surface 150a of the plate body 150 and adjacent two of the block walls 151 and faces a different direction, thereby guiding the airflow of the fan structure 12a toward four different directions. For example, each of the outlet ports 152 is positioned at a corner of the first surface 150a of the plate body 150. The outlet ports 152 on the opposite sides are arranged symmetrically, causing the airflow generated by the fan structure 12a to flow toward and impact the sidewall surfaces 10c of the receiving space S of the housing 10 and then turn to form a vortex flow V (as shown in FIG. 2A) and thereafter flow to the filtering assembly 11.

In addition, each of the block walls 151 is bent outward at a top thereof so as to form a sheet 154, and the sheet 154 has a plurality of (e.g., four) third fastening holes 155. A plurality of bolts (not shown) are passed through the third fastening holes 155 of the sheets 154 and a plurality fourth fastening holes 106 formed on the closure plate 10' on the bottom surface 10d of the receiving space S of the housing 10 so as to fasten the wind guiding plate 15 onto the closure plate 10'. The third fastening holes 155 and the fourth fastening holes 106 are formed at the same time as each of the closure plate 10' and the wind guiding plate 15 is integrally formed, thereby allowing to quickly and accurately align the third fastening holes 155 and the fourth fastening holes 106 when the wind guiding plate 15 is fastened to the closure plate 10'.

In use of the filtering device 1, a handle 105 of the filtering device 1 is held by a machine so as to dispose the first side 10a of the housing 10 of the filtering device 1 on a target frame (not shown) and cause the filtering assembly 11 to face a target space (e.g., a laboratory or a clean room). Then, the fan structure 12a of the fan 12 is started to generate an airflow, causing external air A to flow toward the filtering assembly 11 (in an airflow direction f1 of FIG. 1A). That is, the external air A is sucked into the receiving space S of the housing 10 through the through hole 101 of the second side 10b of the housing 10, passes through the four outlet ports 152 of the wind guiding plate 15 and flows to the filtering assembly 11. After being filtered, the air is discharged (in an airflow direction f2 of FIG. 1A) to a predetermined area of the target space (e.g., the laboratory or clean room). The air discharged from the filtering device 1 meets related requirements of the laboratory (or clean room) (the total piezoelectric efficiency of the filtering device 1 is at least 60%, and in the case of a rectangular housing, the total piezoelectric efficiency of the filtering device 1 is at most 50%).

According to the present disclosure, the housing 10 and the closure plate 10' are fabricated separately, thereby allowing the filtering device 1 to be formed with great weight and volume. Further, since each of the housing 10, the wind guiding plate 15 and the closure plate 10' is integrally formed and the fastening holes of the housing 10, the wind guiding plate 15 and the closure plate 10' are also integrally formed, the present disclosure saves fabrication time and facilitates quick alignment of the fastening holes. Furthermore, the ribs 103 are provided. As such, during operation of the fan 12, the housing 10 is prevented from vibration. Therefore, the present disclosure increases structural strength of the filtering device 1 and reduces vibration and noise. Further, the present disclosure avoids loosening between the target frame and the filtering device 1 that would otherwise result in an unexpected gap between the target frame and the filtering assembly 11. Hence, the present disclosure effectively avoids poor air filtering or backflow of waste gas to the laboratory or clean room.

In addition, through the design of the wind guiding plate 15, the airflow generated by the fan structure 12a (including external air A) forms a vortex flow V that continuously flows toward the filtering assembly 11. As such, small foreign matters (e.g., particles that cannot be filtered by the filtering assembly 11) in the airflow (including external air A) can be thrown away (e.g., thrown onto the sidewall surfaces 10c) through the vortex flow V and large foreign matters can be filtered by the filtering assembly 11. Therefore, the filtering device 1 can effectively improve the cleanness of the discharged air.

The above-described descriptions of the detailed embodiments are to illustrate the implementation according to the present disclosure, and it is not to limit the scope of the present disclosure. Accordingly, all modifications and variations completed by those with ordinary skill in the art should fall within the scope of present disclosure defined by the appended claims.

What is claimed is:
1. A filtering device, comprising:
a housing of an integrally formed channel-shaped structure by die casting of aluminum alloy, wherein the housing has a first side, a second side opposite to the first side and having a hollow-out portion, and a receiving space having a cross section of square with an area of 1200 mm×1200 mm defined by the channel-shaped structure;

a closure plate which is an integrally formed plate structure by die casting of aluminum alloy, and is disposed on the second side of the housing for covering the hollow-out portion;

a filtering assembly disposed on the first side of the housing, wherein the filtering assembly comprises a filter structure for air filtration;

a fan received in the receiving space and fastened to the second side of the housing; and a wind guiding plate received in the receiving space and fastened onto the closure plate, wherein the wind guiding plate is fastened between the filtering assembly and the fan and is integrally formed to have a plate body and a plurality of block walls vertically disposed on sides of the plate body, and wherein each of the block walls has a notch serving as an outlet port formed on a first surface of the plate body and positioned between and adjacent two of the block walls for guiding an airflow from the fan to flow to a sidewall surface of the receiving space of the housing.

2. The filtering device of claim 1, wherein the first side of the housing has an opening serving as a housing outlet port, and the filtering assembly covers the opening.

3. The filtering device of claim 1, wherein the closure plate has a through hole serving as an inlet port, and the fan is disposed at the through hole.

4. The filtering device of claim 1, further comprising a plurality of ribs formed on surfaces of the housing and the closure plate, wherein a plurality of connecting holes are formed at a same time as each of the housing and the closure plate is integrally formed, thereby allowing to align the connecting holes when the closure plate is fastened to the housing.

5. The filtering device of claim 1, wherein the closure plate is arranged with a filter corresponding in position to the fan.

6. The filtering device of claim 1, wherein the fan comprises a fan structure, a support member for disposing the fan structure over the closure plate, and a shaft member axially connected to the support member for rotating the fan structure, and wherein the fan is fastened onto the closure plate.

7. The filtering device of claim 1, wherein the wind guiding plate is integrally formed to serve as a cover for covering the fan.

8. The filtering device of claim 1, wherein each of the block walls of the wind guiding plate is bent outward at a top thereof to form a sheet, wherein the sheet has a plurality of third fastening holes, and a plurality of bolts pass through the third fastening holes and a plurality of fourth fastening holes of the closure plate to fasten the wind guiding plate onto the closure plate, and wherein the third fastening holes and the fourth fastening holes are formed at a same time as each of the closure plate and the wind guiding plate is integrally formed, thereby allowing to align the third and fourth fastening holes when the wind guiding plate is fastened to the closure plate.

9. The filtering device of claim 1, further comprising an electronic device driving the fan.

10. The filtering device of claim 1, wherein the wind guiding plate is integrally formed by die casting of aluminum alloy.

* * * * *